United States Patent [19]

Agarwal

[11] Patent Number: 4,494,209

[45] Date of Patent: Jan. 15, 1985

[54] BLENDING CONTROL SYSTEM

[75] Inventor: Suresh C. Agarwal, Euclid, Ohio

[73] Assignee: The Babcock & Wilcox Company, New Orleans, La.

[21] Appl. No.: 385,423

[22] Filed: Jun. 7, 1982

[51] Int. Cl.³ .............................................. G06F 15/46
[52] U.S. Cl. .................................... 364/502; 364/510; 137/88
[58] Field of Search .......................... 137/88, 91, 93; 364/509, 510, 502

[56] References Cited

U.S. PATENT DOCUMENTS

| | | | |
|---|---|---|---|
| 3,259,141 | 7/1966 | Brendon | 364/510 X |
| 3,438,385 | 4/1969 | Nogami | 364/510 X |
| 3,474,815 | 10/1969 | Beahm et al. | 364/510 X |
| 3,593,735 | 7/1971 | Reiher | 137/88 |
| 3,751,644 | 8/1973 | Mayer | 364/502 |
| 3,762,429 | 10/1973 | Fitzgerald et al. | 137/91 X |
| 3,826,904 | 7/1974 | Leonard et al. | 364/502 X |
| 3,878,376 | 4/1975 | Sholes, Jr. et al. | 364/509 |
| 4,419,898 | 12/1983 | Zanker et al. | 364/510 X |
| 4,420,811 | 12/1983 | Tarnay et al. | 364/502 X |

*Primary Examiner*—Edward J. Wise
*Attorney, Agent, or Firm*—Vytas R. Matas; Robert J. Edwards

[57] ABSTRACT

A control system for blending a rich stream with a diluting stream to obtain a blended stream comprises obtaining values for specific gravities of the rich and diluted streams, a ratio of densities of primary and secondary components in the rich stream and value corresponding to the concentration of primary component in the rich and the blended streams. Additional elements are utilized to obtain actual volumetric flow rates for the rich stream as well as the specific gravity of water in the rich stream and the diluting stream. An algorithm is utilized to manipulate the foregoing values and obtain a desired value for the diluting stream volumetric flow rate and control the flow rate accordingly.

3 Claims, 2 Drawing Figures

BLENDING CONTROL SYSTEM

FIELD AND BACKGROUND OF THE INVENTION

The present invention relates, in general, to process control systems and, in particular, to a new and useful system for controlling the blending of two substances, in particular a concentrated fluid with a diluting fluid.

In many processes, the quality control of a product is supplemented by a blending operation which comprises the mixing of two or more fluid streams to achieve a desired product property. For example, the mixing operation is utilized to control concentrations or specific gravity of a product.

Blending control systems are used which are based upon maintaining the flow rate of the two feed streams at a ratio. This ratio is used to determine a flow rate of the diluting stream from a given flow rate of the concentrated or rich stream. The drawbacks of this arrangement are that the ratio of the two feed streams is normally determined on the basis of design conditions. Such design conditions include temperature, pressure and compositions. The design conditions are assumed for the control system. The actual operating conditions of the system are normally not the same as the design conditions, however. This requires an updating of the ratio to compensate for such changes.

An additional factor which is not considered in the prior art control systems is that, in many blending operations, for example the dilution of hydrochloric acid, sodium hydroxide or potassium hydroxide, the temperature of the product stream changes due to the heat generated (consumed) when the concentrated stream is diluted. The prior art systems do not take the heat of the solution into account. Consequently, the product volume changes due to the change in temperature and thus the product concentration is changed undesirably.

In addition, the individual temperatures of the concentrated and diluting streams may vary. The temperature of water drawn from a city supply, for example, varies with climate. This also contributes to a deviation of the product properties from desired values.

Pertinent prior art references to the present invention include a U.S. Pat. No. 3,294,859 to Prater et al. This patent is related to the analysis and control of multireaction systems. A control system for a blending operation is not disclosed however.

U.S. Pat. No. 3,254,107 to Morgan et al discloses a control system for blending two streams of different substances but does not consider all of the parameters which are considered according to this invention to insure uniform product properties despite fluctuations in the parameters. U.S. Pat. No. 3,751,644 to Meyer also discloses a control system for a blending operation which, similarly, does not consider all of the parameters which may fluctuate to insure uniform product properties.

Other relevant but non-anticipating references are U.S. Pat. No. 3,940,600 to Alexander et al and U.S. Pat. No. 4,272,823 to Pool.

SUMMARY OF THE INVENTION

The present invention is drawn to a control system for a blending operation which, in addition to a ratio of flow rates for a concentrating and diluting stream, utilizes additional parameters including temperature, specific gravity, concentration and volume parameters, to achieve a blended product having consistent and predictable properties.

According to the invention, a rich stream, for example, concentrated hydrochloric acid, sodium hydroxide or potassium hydroxide, is mixed with a diluting stream, for example water, to produce a blended stream having consistent product properties. The increase or decrease in temperature due to the heat of solution in the blended stream is considered in addition to the ratio of flow rates for the diluting and rich streams. Changes in temperature result in changes in volume of the blended stream due to a change in specific gravity caused by the temperature change. According to the invention, the concentration of the blended stream is measured on a mass basis to avoid effects to the volume due to the heat of solution and/or mixing.

In the inventive control system, a feed forward control is utilized in the sense that a desired ratio of diluting stream and rich stream flow rates is computed from the material balance and a feedback control is provided in the sense that temperature and concentration of the blended stream are considered in estimating the flow rate of the diluting stream.

The concentration of the blended stream is thus controlled accurately despite significant heat of mixing and/or solution.

Accordingly, an object of the present invention is to provide an apparatus for controlling the blending of a rich stream having a primary and a secondary component and a diluting stream to form a blended stream comprising:

(a) means connected to the rich stream for obtaining the values $V_1$, the volumetric flow rate of the rich stream; $\sigma^1_1$, the specific gravity of the rich stream; $y_1$, the concentration of primary component in the rich stream; $P^1_a$, the density of primary components in the rich stream; $P^1_b$, the density of secondary component in the rich stream; and $P^1_{H2O}$, the density of water in the rich stream;

(b) means connected to the diluting stream for regulating the volumetric flow rate $V_2$ of the diluting stream;

(c) means connected to the blended stream for obtaining the values of $\sigma^3_1$, the specific gravity of the blended stream; $Y_3$, the concentration of primary component in the blended stream; $P^3_a$, the density of primary component in the blended stream; and $P^3_{H2O}$, the density of water in the blended stream; and (d) logic means connected to the means connected to the rich, diluting and blended stream for obtaining a value $V_2$ corresponding to a desired volumetric flow rate of the diluting stream and for applying that value to the means for regulating the volumetric flow rate of the diluting stream.

Another object of the invention is to provide such an apparatus wherein the logic means is operable to obtain the volumetric flow rate $V_2$ according to the following formula:

$$\frac{V_2}{V_1} = \frac{P^3_{H2O}}{P^1_b} \frac{P_a^1}{P_a^3} \sigma^3_1 \frac{y_1}{y_3} - \sigma^1_1 \frac{P^1_{H2O}}{P_b^2}$$

A further object of the invention is wherein the diluting stream is water and the density of water is assumed to be constant, is to provide a control of the diluting operation which controls the volumetric flow rate of the diluting stream according to the following relationship:

$$\frac{V_2}{V_1} = \frac{P_a^1}{P_a^3} \sigma_3^1 \frac{y_1}{y_3} - \sigma_1^1 \qquad 5$$

For an understandding of the principles of the invention, reference is made to the following description of typical embodiments thereof as illustrated in the accompanying drawing.

DESCRIPTION OF THE PREFERRED EMBODIMENTS

Figure 1:
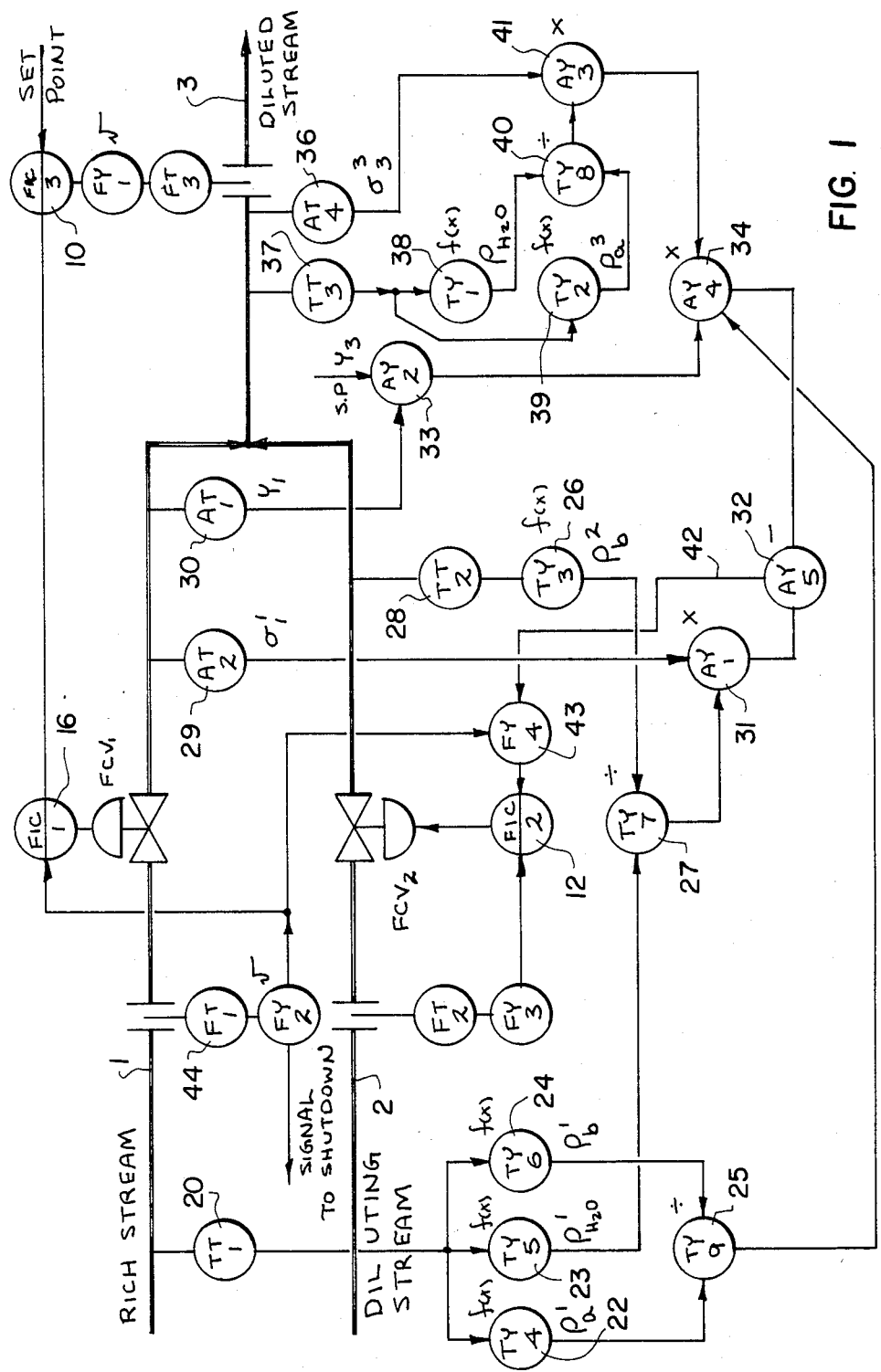
FIG. 1 is a schematic representation of the blending control system according to the invention.

Referring to the drawings, in particular, the invention embodied therein in FIG. 1 comprises a control apparatus for controlling a blending operation between a rich stream 1 containing a primary and possibly a secondary component, and a diluting stream 2 to form a diluted or blended stream 3. The same reference numerals are used in FIGS. 1 and 2 to designate the same or similar parts.

Before discussing the details of the embodiments shown in FIGS. 1 and 2, the analysis which underlies the present invention is first set forth as follows.

Let:
$F_1$ = Mass flow rate of rich feed stream
$F_2$ = Mass flow rate of dilutant stream
$X_1$ = Mass fraction of primary component in stream $F_1$
$X_2$ = Mass fraction of primary component in stream $F_2$
$F_3$ = Mass flow rate of product stream
$X_3$ = Mass fraction of primary component in stream $F_3$ By overall material balance:

$$F_3 = F_1 + F_2 \qquad (1)$$

By primary components balance $$F_1 X_1 + F_2 X_2 = F_3 X_3 \qquad (2)$$

On eliminating $F_3$ between (1) and (2), we have $$\frac{F_2}{F_1} = \frac{X_1 - X_3}{X_3 - X_2} \qquad (3)$$

Let $V_1$ and $V_2$ be volumetric flow rate, and $P_1$ and $P_2$ be the density of specific streams $F_1$ and $F_2$. Then $$F_2 = P_2^2 V_2 \qquad (4)$$

$$F_1 = P_1^1 V_1 \qquad (5)$$

where $P_2^2$ is density at temperature and pressure of stream $F_2$ and $P_1$ is density at temperature and pressure of stream $F_1$. Let:
$y_1$ be concentration of primary components on volume basis, in stream $F_1$
$y_2$ be concentration of primary component, on volume basis, in stream $F_2$
$y_3$ be concentration of primary component on volume basis, in stream $F_3$.

As there are only two components a and b, a being primary component, in each of the stream under consideration, hence $$X_1 = \frac{P_a^1 y_1}{P_a^1 y_1 + P_b^1 (1 - y_1)} \qquad (6)$$

$$X_2 = \frac{P_a^2 y_2}{P_a^2 y_2 + P_b^2 (1 - y_2)} \qquad (7)$$

and, $$X_3 = \frac{P_a^3 y_3}{P_a^3 y_3 + P_b^3 (1 - y_3)} \qquad (8)$$

where,
P = Density of pure component subscripts meaning
a—refers to component a
b—refers to component b
superscripts meaning:
1—Density at temperature and pressure of stream $F_1$
2—Density at temperature and pressure of stream $F_2$
3—Density at temperature and pressure of stream $F_3$.
Also, $$\sigma_1^1 = [P_a^1 y_1 + P_b^1(1 - y_1)]/P_{H2O}^1 \qquad (9)$$

$$\sigma_2^2 = [P_a^2 y_2 + P_b^2(1 - y_2)]/P_{H2O}^2 \qquad (10)$$

$$\sigma_3^3 = [P_a^3 y_3 + P_b^3(1 - y_3)]/P_{H2O}^3 \qquad (11)$$

where, $\sigma_1^1$, $\sigma_2^2$, and $\sigma_3^3$ are specific gravity of streams $F_1$, $F_2$ and $F_3$ respectively at their respective temperature and pressure.

By combining equations (6) and (9), (7) and (10), and (8) and (11), we have $$X_1 = (P_a^1 y_1)/(\sigma_1^1 P_{H2O}^1) \qquad (12)$$

$$X_2 = (P_a^2 y_2)/(\sigma_2^2 P_{H2O}^2) \qquad (13)$$

$$X_3 = (P_a^3)/(\sigma_3^3 P_{H2O}^3) \qquad (14)$$

By combining equations (3), (4), (5), (12), (13) and (14), we have $$\frac{V_2}{V_1} = \frac{P_1^1}{P_2^2} \left[ \frac{(P_a^1 y_1/\sigma_1^1 P_{H2O}^1) - (P_a^3 y_3/\sigma_3^3 P_{H2O}^3)}{(P_a^3 y_3/\sigma_3^3 P_{H2O}^3) - (P_a^2 y_2/\sigma_2^2 P_{H2O}^2)} \right] \qquad (15)$$

Equation (15) gives the ratio of volumetric flow rate of streams $f_2$ to $F_1$. This equation accounts for variation in temperature and pressure via changes in specific gravity of respective streams and component densities.

Equation (15) can be simplified by considering the actual conditions of a process.

In most of the processes, the diluent stream $F_2$ does not contain primary component, hence $x_2 = y_2 = 0$. Therefore, $$\frac{V_2}{V_1} = \frac{P_{H2O}^3}{P_b^1} \frac{P_a^1}{P_a^3} \sigma_3^3 \frac{y_1}{y_3} \sigma_1^1 \frac{P_{H2O}^1}{P_b^2} \qquad (16)$$

For the cases where diluent stream ($F_2$) is water, we have $$\frac{V_2}{V_1} = \frac{P^3_{H2O}}{P^1_{H2O}} \frac{P_a^1}{P_a^3} \sigma_3^3 \frac{y_1}{y_3} - \sigma_1^1 \frac{P^1_{H2O}}{P^2_{H2O}}$$

Since the density of liquid water does not change significantly with temperature or pressure, that is, $$P^1_{H2O} = P^2_{H2O} = P^3_{H2O}.$$

Therefore, $$\frac{V_2}{V_1} = \frac{P_a^1}{P_a^3} \sigma_3^3 \frac{y_1}{y_3} - \sigma_1^1 \tag{18}$$

A blending control system which is based on equation (16) is shown in FIG. 1. Conventional control components are used, however, the invention can also be easily and naturally implemented through a control computer system.

Total diluted stream demand is input as setpoint to a flow controller 10 (FRC-3), which generates a signal representing the desired flow rate of rich stream. This signal is used as setpoint to flow controller 16 (FRC-1).

This control system is based on all measured signals and can be simplified for individual cases; some of which are:

1. When the diluting stream does not contain primary component, then its flow rate is given by equation (18). Hence, the control system is simplified since TY-5, TY-6, TY-1, TT-2 and associated computing elements are deleted. The simplified control scheme is shown in FIG. 2.

2. One or more process variables of the feed stream may be constant due to upstream control schemes, for example, temperature of rich streams. In such cases, constant value(s) can be used, thus eliminating associated sensor(s) and computing elements.

In greater detail, and referring to FIG. 1, a set point signal is provided to rich stream flow controller 16. A desired flow rate, as controlled by controller 12 for the diluting stream 2 must then be established. The rich stream 1 is provided with a temperature transmitter 20 which has an output connected to three function generators 22, 23 and 24. Function generator 22 generates the value $P_a^1$ and function generator 24 generates the value $P_b^1$. The ratio of primary component to secondary component density is then taken in division element 25. Function generator 23 generates a value $P_{H2O}$ which is divided by the value $P_b^2$ of a function generator 26 in a division element 27. The value of secondary component density in the diluting stream 2 is generated in function generator 26 by a temperature transmitter 28 connected to the diluting stream 2.

Transmitters 29 and 30 transmit values corresponding to the rich stream specific gravity $\sigma_1^1$ and primary component concentration $y_1$ respectively. The output of dividing unit 27 is multiplied by $\sigma_1^1$ in multiplication element 31 and this value is subtracted in element 32 from a value generated by multiplication element 34. Multiplication element 34 multiplies the ratio $y_1/y_3$ obtained in division element 33 which is connected to receive a signal from transmitter 30 and the manually entered setpoint value of primary component concentration in the blended stream 3. Transmitter 36 is utilized to provide a value $\sigma_3^3$ corresponding to the blended stream specific gravity and temperature transmitter 37 which is connected to the blended stream 3, provides a temperature value which in function generators 38 and 39 generate the density of water in the blended stream and the density of primary component, respectively. These quantities are divided in dividing element 40 and then multiplied in element 41 by the diluted stream specific gravity. The ratio $V_2/V_1$ is then provided over a line 42 from subtraction element to an element 43 which is connected to a flow transmitter 44 connected to the rich stream 1. The rich stream volumetric flow rate $Y_1$ is then multiplied by the volumetric flow rate ratio so that a desired value of $V_2$, the diluting stream flow rate, is supplied over controller 12 to a value in the diluted stream line 2.

Figure 2:
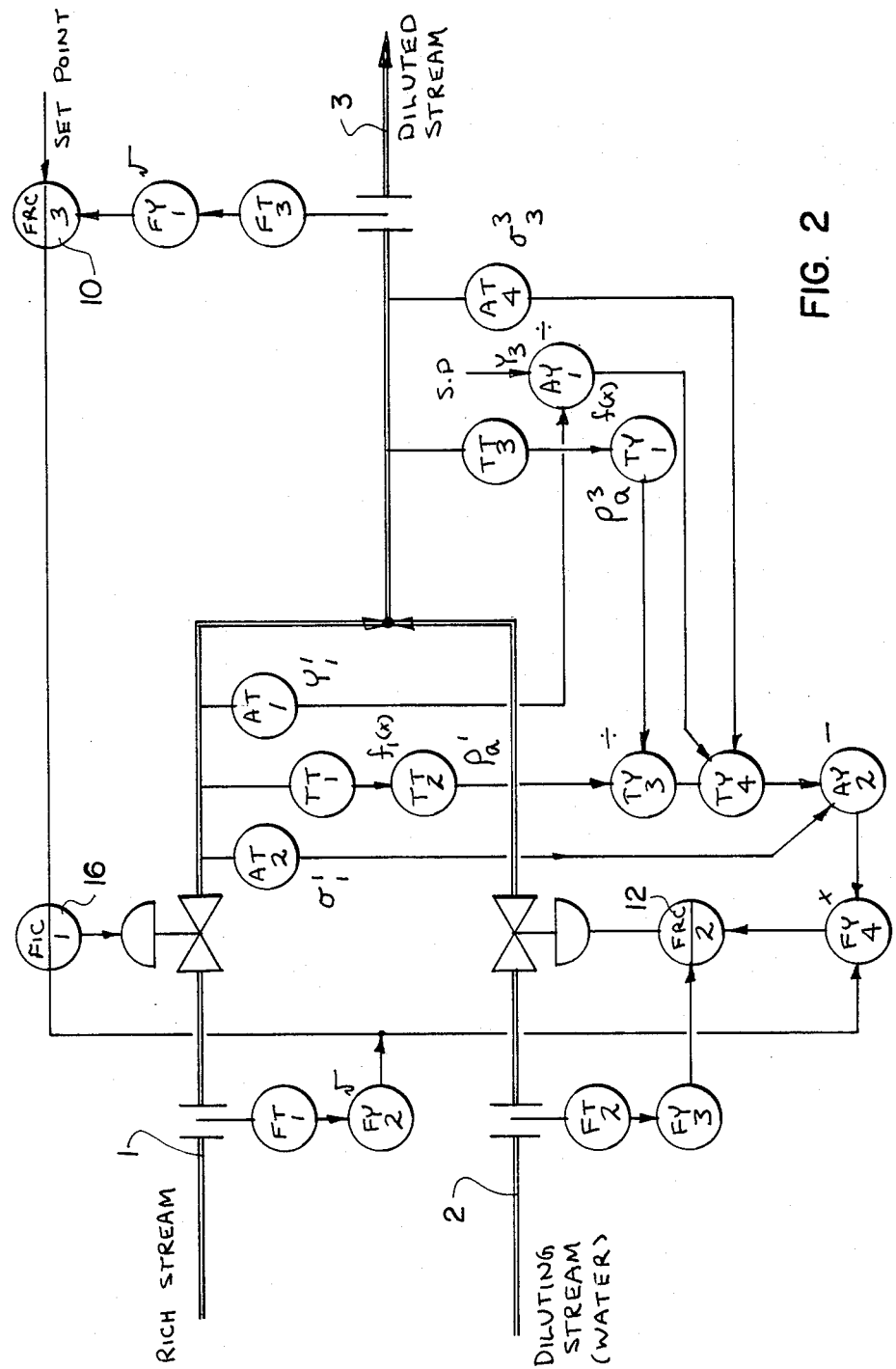
FIG. 2 is a schematic diagram of a blending system according to another feature of the invention wherein certain simplifications are assumed.

In FIG. 2, which follows equation (18) above, fewer elements are necessary as shown.

While specific embodiments of the invention have been shown and described in detail to illustrate the application of the principles of the invention, it will be understood that the invention may be embodied otherwise without departing from such principles.

What is claimed is:

1. An apparatus for controlling the blending of a rich stream having a primary and a secondary component and a diluting stream to form a blended stream comprising:
   (a) means connected to the rich stream for obtaining the values $V_1$, the volumetric flow rate of the rich stream; $\sigma_1^1$, the specific gravity of the rich stream; $y_1$, the concentration of primary component in the rich stream; $P_1^1 a$, the density of primary components in the rich stream; $P_b^1$, the density of secondary component in the rich stream; and $P^1_{H2O}$, the density of water in the rich stream;
   (b) means connected to the diluting stream for regulating the volumetric flow rate $V_2$ of the diluting stream;
   (c) means connected to the blended stream for obtaining the values of $\sigma_1^3$, the specific gravity of the blended stream; $y_3$, the concentration of primary component in the blended stream; $P^3_a$, the density of primary component in the blended stream; and $P^3_{H2O}$, the density of water in the blended stream;
   (d) logic means connected to the means connected to the rich, diluting and blended stream for obtaining a value $V_2$ corresponding to a desired volumetric flow rate of the diluting stream and for applying that value to the means for regulating the volumetric flow rate of the diluting stream; and
   (e) wherein said logic means is operable according to the following:

$$\frac{V_2}{V_1} = \frac{P^3_{H2O}}{P_b^1} \frac{P_a^1}{P_a^3} \sigma_3^3 \frac{y_1}{y_3} - \sigma_1^1 \frac{P^1_{H2O}}{P_b^2}$$

wherein $P_b^2$ is the density of secondary component in the diluting stream, the apparatus including means connected to the diluting stream for generating $P_b^2$.

2. An apparatus according to claim 1, wherein the primary component is chosen from hydrochloric acid, potassium hydroxide and sodium hydroxide, the secondary component being water.

3. An apparatus for controlling the blending of a rich stream having a primary component and a diluting stream of water to form a blended stream comprising:

(a) means connected to the rich stream for obtaining a value $V_1$ corresponding to the volumetric flow rate of the rich stream; a value $\sigma_1^1$ corresponding to the specific gravity of the rich stream; $y_1$ corresponding to the concentration of primary component in the rich stream; and $P_a^1$ corresponding to the density of primary component in the rich stream;

(b) means for regulating the volumetric flow rate $V_2$ in the diluting stream;

(c) means connected to the blending stream for obtaining a value $\sigma_3^3$ corresponding to the specific gravity of the diluted stream; $Y_3$ corresponding to the concentration of primary component in the blending stream; and $P_a^3$ corresponding to the density of primary component in the blending stream; and logic means connected to said rich stream and said diluting stream of water for regulating the volumetric flow rate $V_2$ according to the formula:

$$\frac{V_2}{V_1} = \frac{P_a^1}{P_a^3} \sigma_3^3 \frac{y_1}{y_3} - \sigma_1^1.$$

* * * * *

UNITED STATES PATENT AND TRADEMARK OFFICE
CERTIFICATE OF CORRECTION

PATENT NO. : 4,494,209
DATED : January 15, 1985
INVENTOR(S) : SURESH C. AGARWAL

It is certified that error appears in the above-identified patent and that said Letters Patent are hereby corrected as shown below:

In column 6, line 31, change "$P_1{}^1a$" to $--P_a{}^1--$.

In column 6, line 39, change "$\Gamma_1{}^3$" to $--\Gamma_3{}^3--$.

In column 6, line 41, change "$P^3a$" to $--P_a{}^3--$.

In column 7, line 13, change "$Y_3$" to $--y_3--$.

In column 4, equation 16, insert the subtraction symbol "-" between "$\dfrac{y_1}{y_3}$" and "$\Gamma_1{}^1$".

In column 5, the equation at the top of the page, insert the subtraction symbol "-" between "$\dfrac{y^1}{y_3}$" and "$\Gamma_1{}^1$".

Signed and Sealed this

Tenth Day of November, 1987

Attest:

DONALD J. QUIGG

Attesting Officer

Commissioner of Patents and Trademarks